Patented Nov. 19, 1935

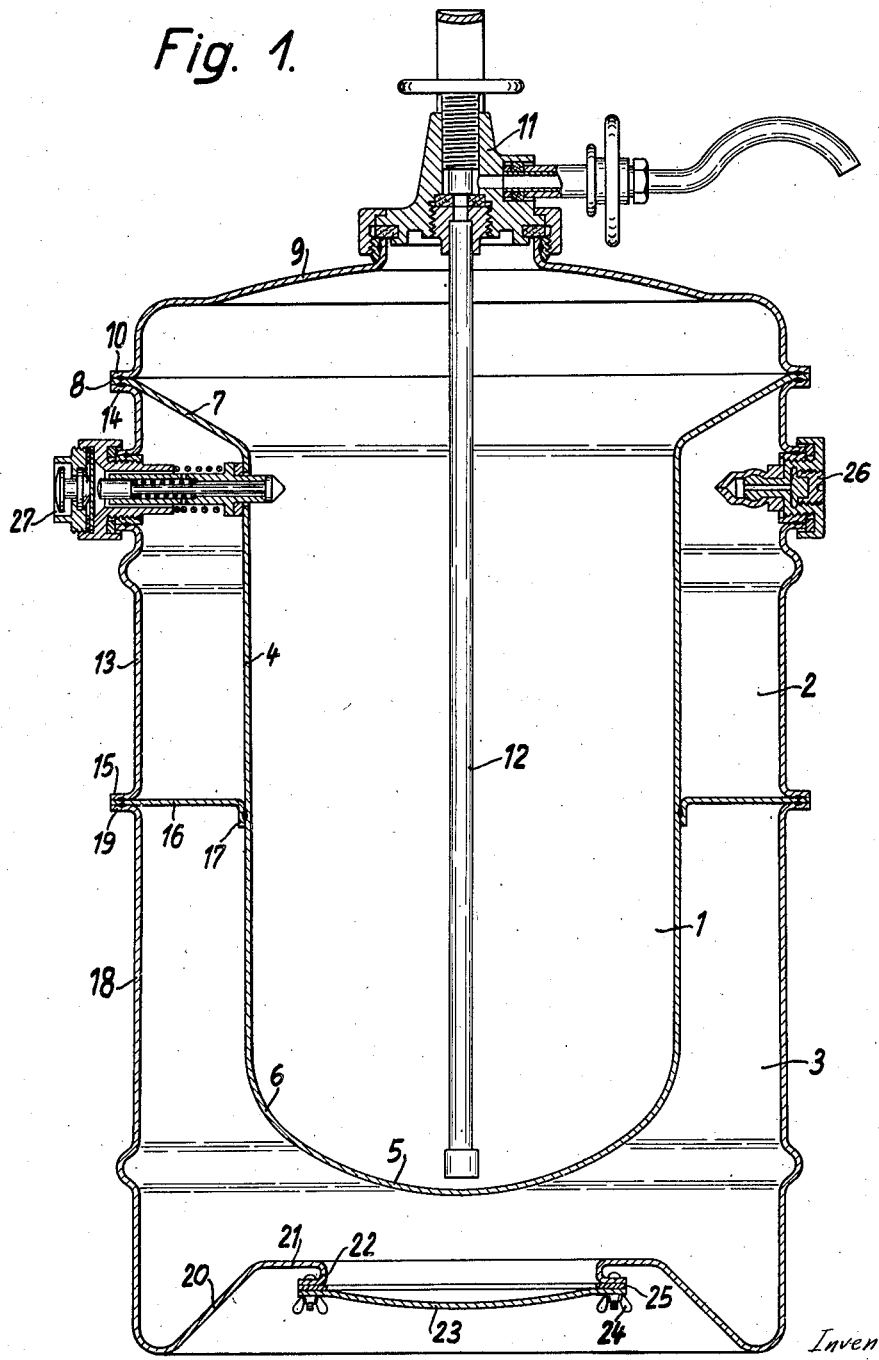

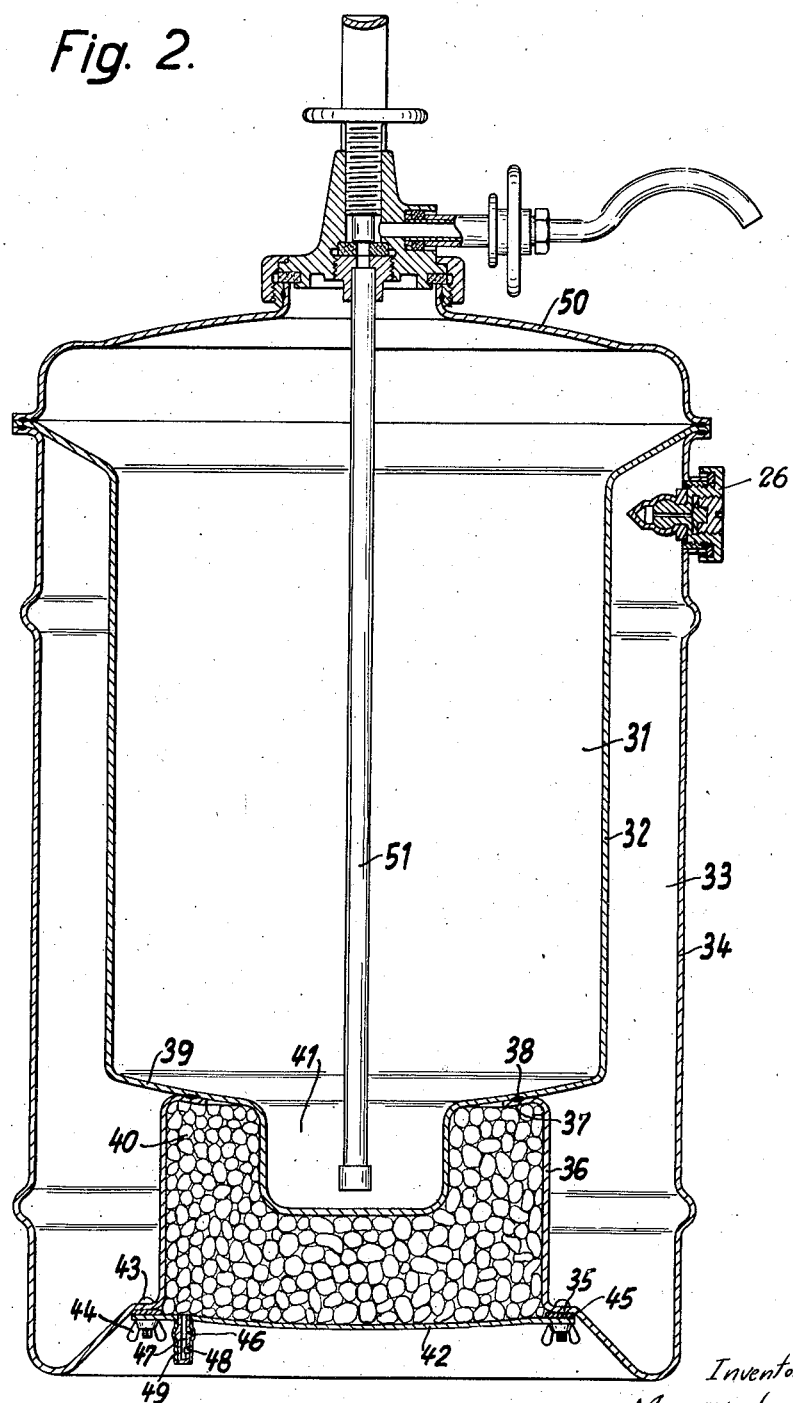

2,021,367

UNITED STATES PATENT OFFICE 2,021,367

BEVERAGE DELIVERING APPARATUS

Martin Louis, Essen, Germany, assignor to Fried. Krupp Aktiengesellschaft, Essen-on-the-Ruhr, Germany Application September 6, 1933, Serial No. 688,399
In Germany July 10, 1933

15 Claims. (Cl. 225—18)

My invention relates to metallic beverage delivering apparatus such as portable siphons, beverage vending apparatus and like devices, and has for its object to provide apparatus of this class in a particularly suitable manner with a cooling means container by which a very quick cooling of the liquid to be delivered is obtained in a very simple and efficacious manner.

In order that my invention may be clearly understood and readily carried into effect, two preferred embodiments of the same are illustrated by way of example in the drawings which accompany and form part of this specification.

In these drawings

Figure 1 is a vertical section of a portable siphon constructed in accordance with my invention, and Figure 2 is a similar section of the other embodiment.

Referring first to Figure 1, by 1 is denoted the liquid container of the siphon, 2 is the pressure medium container and 3 is the container for the cooling means. The liquid container 1 is a substantially pot-shaped vessel, having a shell 4 and a bottom 5. The latter is vaulted downward so as to subside into the shell 4 with an ample rounding. The shell 4 at top has a conical enlargement 7 which goes over into a plane flange 8 on which rests a corresponding flange 10 of the cover 9 of the liquid container. The cover 9 has mounted on it the tap valve 11 and the ascension pipe 12.

The pressure medium container 2 is of annular shape and forms a jacket around the liquid container 1. It has an outer shell 13 which abuts by an outer flange 14 at the top thereof on the flange 8 of the liquid container. A similar flange 15 is provided on the lower end of the shell 13. Below the pressure medium container 2 is disposed the cooling means container 3 which likewise is of annular shape but has a bottom portion extending down to such an extent that also the bottom 5 of the liquid container 1 is embraced by it. The pressure medium container 2 and the cooling means container 3 are separated from one another by an annular partition 16 which by an inner flange 17 is fixed to the shell 4 of the liquid container 2 by a resistance seam weld. The shell 18 of the cooling means container 3 at top has an outer flange 19. The parts 15, 16, 19 as well as the flanges 10, 8, 14 are interconnected by respective common resistance seam welds. The shell 18 extends downwardly beyond the bottom 5 of the liquid container and with an ample curvature goes over into an inwardly projecting conical portion 20 and a plane flanged central portion 21. The latter has an aperture 22 through which the cooling means can be introduced from outside and which is closed by a cover 23 fixed thereto by means of screw bolts and wing nuts 24 and tightened by means of a packing ring 25. All vital parts of the siphon are manufactured from stainless steel. 26 denotes the inlet valve for the pressure medium and 27 the valve by which the passage of the pressure medium from the container 2 to the liquid container 1 can be regulated from outside.

The described siphon is remarkable for a very good appearance and by its manufacture being comparatively simple. Furthermore, as the cooling means container surrounds the lower portion of the liquid container 1 and also embraces the bottom 5 thereof from all sides, the liquid to be delivered can be cooled particularly quickly and effectively at the place of withdrawal, that is at the entrance end of the ascension pipe 12. This advantageous effect is further increased by the bottom 5 of the liquid container being convex, whereby the further advantage is obtained that ordinary ice can be used as cooling means which later on can float within the container 3. Instead of ordinary ice, dry ice can be used as cooling means. In this case, however, the wing nuts 24 must not be completely tightened, in order to enable the gaseous carbon dioxide formed to escape through the bottom aperture 22.

Finally, the strength of the siphon body is considerably increased by the construction hereinbefore described. For, if the filled siphon is in a horizontal position, the weight of the full liquid container is transmitted through the partition 16 to the outer shell 13, 18. This advantage is of particular importance with siphons of great capacity.

In the embodiment illustrated in Figure 2, the liquid container 31 is formed by a substantially pot-shaped vessel 32 and is surrounded by an annular pressure medium container 33, the shell of which is denoted by 34. The bottom of the latter is inwardly bent and goes over into a conical flange with plane shoulder 35 and a cylindrical portion 36. This latter portion, at the top thereof, has an inwardly directed flange 37 by which it is connected by resistance seam welding 38 to the bottom 39 of the vessel 32 forming the liquid container. The space 40 enclosed by the bottom 39 and cylindrical portion 36 constitutes the cooling means container. The bottom 39 has a central recess 41 which forms an extension of the liquid container 31 and projects into the cooling means container. The ascension pipe 51 of the siphon extends down into this recess 41. A nipple device 26 provides a means for charging the chamber 33 with a pressure medium.

The cooling means container 40 is closed at the bottom by means of an easily detachable cover 42, which is water-tightly fixed thereto by screw bolts 43 with wing nuts 44 arranged on the plane shoulder 35, a packing ring 45 being interposed between the cover 42 and shoulder 35.

Generally ordinary ice will be used as filling for the cooling means container 40. Preferably the remaining intermediate spaces are filled with water in order to insure that, upon melting of the ice, the water level in the cooling chamber remains so high that the water at least is in contact with the cylindrical wall of the extension 41.

In order to permit also cooling by means of dry ice, a rubber tube valve is provided in the cover 42. This valve consists of a tubular socket 46 the longitudinal bore 47 of which is closed at bottom while its transverse bore 48 is shut off by a rubber tube 49 slid onto the socket 46. The rubber tube has such a tension that the valve does not leak if ordinary ice is used, but the tension must not be too great in order that with dry ice the pressure in the chamber 40 becomes not too high and vaporization of the ice is not prevented.

The shells 32 and 34 and the cover 50 of the siphon are interconnected by a resistance seam weld at the top.

Since the cooling chamber is disposed below the bottom of the liquid container, very quick cooling of the liquid to be delivered is obtained. Furthermore, the construction of this second embodiment likewise is comparatively simple and its manufacture very easy and less expensive. These advantages would be achieved, at least in part, even if one would not provide a cooling means container rigidly connected to the siphon, and in lieu thereof, would extend the liquid container down to or nearly to the lower end of the pressure medium container and connect the shell of the latter with the liquid container in the described manner. In this case it is desirable to place the siphon, when it is to be cooled, in any flat cooling vessel.

What I claim and desire to secure by Letters Patent is:—

1. A beverage delivering apparatus of the class described, comprising a liquid container, an annular pressure medium container surrounding the former, and a cooling means container disposed laterally of and below said liquid container, said last mentioned container being bounded by at least one portion of said pressure medium container.

2. A beverage delivering apparatus of the class described, comprising a liquid container, an annular pressure medium container surrounding the former, and a cooling means container disposed below said liquid container and embracing the entire bottom surface of the latter.

3. A beverage delivering apparatus of the class described, comprising a liquid container having a convex bottom, an annular pressure medium container surrounding said liquid container, and a cooling means container disposed below the latter and embracing its entire bottom surface.

4. A beverage delivering apparatus of the class described, comprising a liquid container having a convex bottom, an annular pressure medium container surrounding said liquid container, and a cooling means container disposed below the latter and embracing its entire bottom surface, the bottom of the apparatus being bent inwardly and having an aperture and a detachable cover therefor, in order to give access to said cooling means container.

5. A beverage delivering apparatus of the class described, comprising a liquid container, an annular pressure medium container surrounding it, and a cooling means container disposed below said liquid container said pressure medium container and cooling means container being separated by an annular partition fixed by means of an inner flange to said liquid container, the shells of said pressure medium container and cooling means container each abutting against said partition with an outer flange connected therewith by resistance seam welding.

6. A beverage delivering apparatus of the class described, comprising a liquid container, an annular pressure medium container surrounding the former, and a cooling means container disposed below said liquid container so as to be in contact only with the bottom of the latter.

7. A beverage delivering apparatus of the class described comprising a liquid container, an annular pressure medium container surrounding the former, and a cooling means container disposed below said liquid container, so as to be in contact with the bottom of the latter, said liquid container having an extension at the bottom thereof extending into said cooling means container.

8. A beverage delivering apparatus of the class described, comprising a liquid container, an annular pressure medium container surrounding the former, and a cooling means container disposed below said liquid container so as to be in contact only with the bottom of the latter, said pressure medium container extending downwardly to such an extent that its inner wall simultaneously forms the outer wall of said cooling means container.

9. A beverage delivering apparatus as specified in claim 8 in which the shell of said cooling means container has an inner flange at the top thereof which is connected to the bottom of said liquid container.

10. A beverage delivering apparatus as specified in claim 8 in which the shell of said pressure medium container is formed by one single drawn piece.

11. A beverage delivering apparatus as specified in claim 6, comprising means for air-tightly closing said cooling means container.

12. A beverage delivering apparatus as specified in claim 6 comprising a safety escape valve on said cooling means container.

13. A beverage delivering apparatus as specified in claim 6 comprising a rubber tube escape valve on said cooling means container.

14. A beverage delivering apparatus of the class described, comprising a liquid container, a jacket surrounding said container, and partition means between said jacket and said liquid container defining a pressure medium container and a cooling means container, said last mentioned container surrounding the lower portion of said liquid container.

15. A beverage delivering apparatus of the class described, comprising a liquid container, a jacket surrounding said container, and a bracing partition between said jacket and said liquid container subdividing the space between said container and jacket into a pressure medium container and a cooling means container, said last mentioned container surrounding the lower portion of said liquid container.

MARTIN LOUIS.